United States Patent [19]

Zierhut

[11] Patent Number: 5,020,154
[45] Date of Patent: May 28, 1991

[54] TRANSMISSION LINK

[75] Inventor: Hermann Zierhut, Munich, Fed. Rep. of Germany

[73] Assignee: Siemens Aktiengesellschaft, Berlin & Munich, Fed. Rep. of Germany

[21] Appl. No.: 511,196

[22] Filed: Apr. 19, 1990

[30] Foreign Application Priority Data

Apr. 20, 1989 [EP] European Pat. Off. ........ 89107170.6

[51] Int. Cl.$^5$ .............................................. H04B 10/00
[52] U.S. Cl. ................................... 455/608; 455/102; 455/103; 455/617; 332/108
[58] Field of Search ................. 455/608, 617, 61, 102, 455/103, 137; 332/108, 112, 119, 151

[56] References Cited

U.S. PATENT DOCUMENTS

| | | | |
|---|---|---|---|
| 2,952,812 | 9/1960 | Klein, Jr. et al. | 332/108 |
| 3,956,626 | 5/1976 | Ross | 455/608 |
| 4,150,284 | 4/1979 | Trenkler et al. | 455/608 |
| 4,442,528 | 4/1984 | Fukuda | 455/608 |
| 4,627,105 | 12/1986 | Ohashi et al. | 455/617 |
| 4,928,318 | 5/1990 | Ibe et al. | 455/608 |

Primary Examiner—Reinhard J. Eisenzopf
Assistant Examiner—Kinfe-Michael Negash
Attorney, Agent, or Firm—Kenyon & Kenyon

[57] ABSTRACT

A transmission link for transmitting a sequence of signals comprising pulse and interval signals, across a transmission medium from a transmitter to a receiver circuit of a receiver, whereby each pulse signal is modulated with a frequency. At least two frequencies are used to modulate the pulses, and a separate evaluation circuit is provided in the receiver for each modulating frequency. The output signals of the evaluation circuits are concatenated (linked in series) by a AND-gate circuit.

18 Claims, 2 Drawing Sheets

TRANSMISSION LINK

BACKGROUND OF THE INVENTION

This invention relates to a transmission link having high interference immunity and, more particularly, to a transmission link for transmitting a succession of pulses separated by intervals to a receiving circuit of a receiver, in which each pulse is modulated with a frequency.

In known types of transmission links, such as infrared transmission links, each pulse signal is usually modulated with one frequency. In a transmission link of this type, pulse signals have a frequency of approximately 1 to 10 kHz, and the modulating frequency in a known system called "Infra-fern", lies at approximately 40 kHz. When disturbances appear in the pulse frequency or in the modulating frequency, the transmission link cannot always be kept free of disturbances despite the increased reliability through the use of a modulating frequency.

There is a need for a transmission link having a high interference immunity, low energy consumption, and simple design.

SUMMARY OF THE INVENTION

This and other needs are satisfied by the present invention in the first instance by using a transmission link having at least two frequencies for modulating the pulse signals. A separate evaluation circuit is provided in the receiver for each modulating frequency. The outputs of the evaluation circuits are each coupled to an AND gate. The signal appearing at the receiver circuit is only accepted when it is received without disturbance over each of the transmission links, each transmission link corresponding to a modulating frequency. The higher the number of transmission links, the more likely erroneous information will be excluded at the receiver.

The signal, which contains the message or information, can be a baseband or an encoded signal. The signal can be encoded by a variety of methods including dual phase, PPM, PAM etc.

In a further development of the present invention, the transmission link is constructed so that a first modulating frequency which modulates the pulses is modulated by a second, higher modulating frequency. This principle can be continued accordingly with a third or higher modulating frequency. In the case of two modulating frequencies, the first modulating frequency preferably lies in the 30 to 50 kHz range and the second modulating frequency lies in the 400 to 500 kHz range. A frequency of 455 kHz, which is held open in AM radio for intermediate frequencies, can be used in a technically favorable manner in order to avoid electrical shielding measures such as on an infrared input amplifier.

The transmission link can also be constructed so that after the pulse signals have been modulated with a first modulating frequency, these modulated pulse signals are then alternately modulated by a second modulating frequency and third modulating frequency. Fourth and higher frequencies can be used in this manner. The interference immunity can be increased when the additional modulating frequency has only a relatively small frequency differential compared to the previous frequency.

The present invention can be realized using many signalling methods, in particular, the transmission link can operate with infrared signals.

BRIEF DESCRIPTION OF THE DRAWINGS

FIGS. 3, 4, and 5 are not drawn to scale.

DETAILED DESCRIPTION

Figure 1:
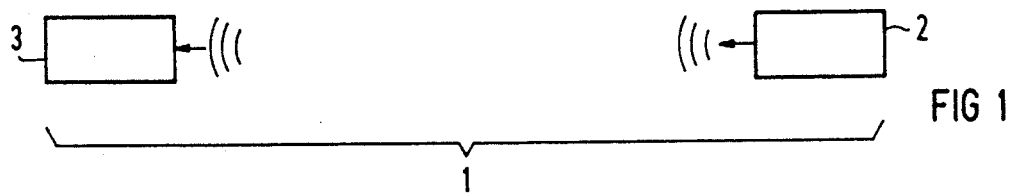
FIG. 1 is a block diagram of a transmission link.

Referring to FIG. 1, a transmission link 1 comprising a transmitter 2 and a receiver 3 is shown. A sequence of pulses 4 spaced by intervals 5 are transmitted in a medium such as infrared light to the receiver circuit of the receiver 3.

Figure 2:
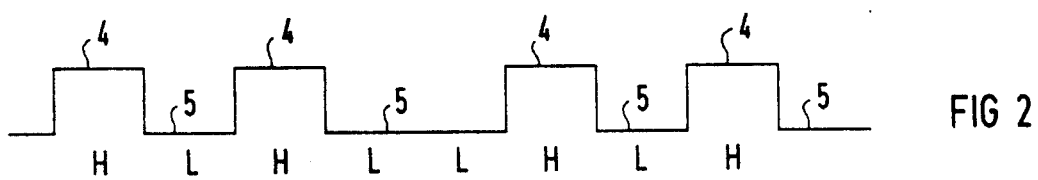
FIG. 2 shows a waveform comprising a sequence of pulses and intervals that represent a signal or a sequence of signals.

Referring to FIG. 2, a waveform comprising a sequence of pulses spaced by intervals is shown. The pulses and intervals signals can represent the high and low signals of a binary signal system. In this known system high and low signals represent the binary digits 1 and 0.

Figure 3:
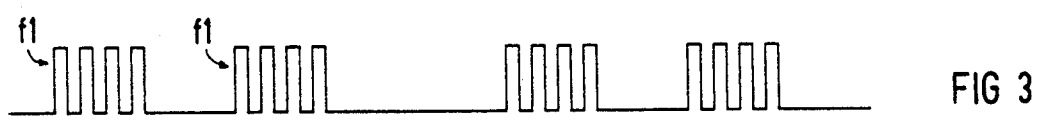
FIG. 3 shows a waveform comprising pulses that are modulated with a first modulating frequency according to the present invention.

Referring to FIG. 3, a waveform of pulses generated using a known method of modulation is shown. In this method, each pulse signal of FIG. 2 is modulated with one frequency (e.g. f1). In the prior art, modulation stops here. With the present invention the waveform of FIG. 3 is further modulated, i.e., according to the present invention, several frequencies are used to modulate the pulses.

Figure 4:
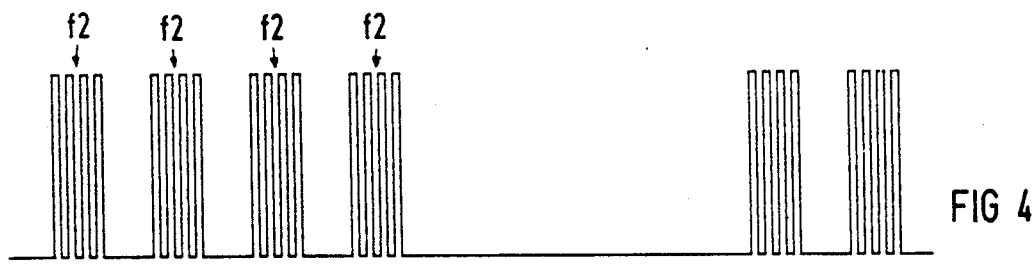
FIG. 4 shows a waveform comprising a sequence of pulses that has been modulated with a first modulating frequency and then modulated with a second, higher modulating frequency according to the present invention.

Referring to FIG. 4, a waveform of one full pulse and a part of a pulse generated using a method of the present invention is shown. In this embodiment, two frequencies, f1 and f2, are used to modulate the pulse signals. The first modulating frequency f1, corresponding to f1 in FIG. 3, can have a frequency magnitude in the 30 to 50 kHz range, and the second modulating frequency can have a frequency magnitude in the 400 to 500 kHz range.

Figure 4A:
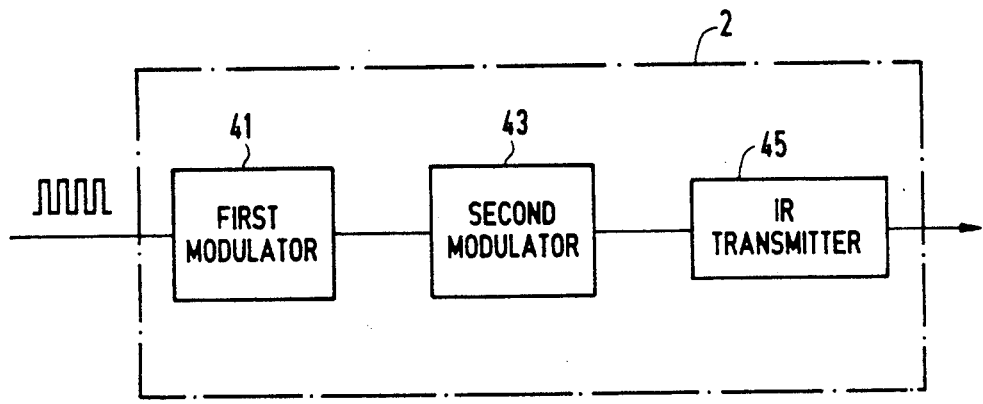
FIG. 4a is a block diagram of a transmitter using two consecutive modulating frequencies constructed according to the present invention.

Referring to FIG. 4a, the transmitter 2 for implementing the aforementioned method is shown. Pulses are modulated by a first modulator 41. The first modulator 41 is coupled to a second modulator 43. Pulses modulated by the first modulator 41 are then modulated by the second modulator 43. The resulting modulated waveform is then transmitted by the IR transmitter 45.

Figure 5:
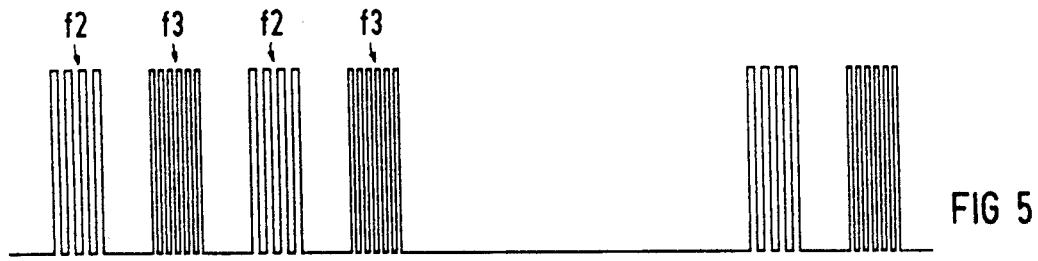
FIG. 5 shows a waveform comprising a sequence of pulses that has been modulated with a first modulating frequency and then each modulated pulse is alternately modulated with a second and a third modulating frequency according to the present invention.

Referring to FIG. 5, a waveform of pulse signals generated using another method of the present invention is shown. In this method of transmission, the pulse signals are modulated using three modulating frequencies. In a first step, the pulse signals are modulated by a first modulating frequency to obtain a waveform such as that shown in FIG. 3. Then, pulse signals are alternately modulated with a second and third modulating frequencies.

Figure 5A:
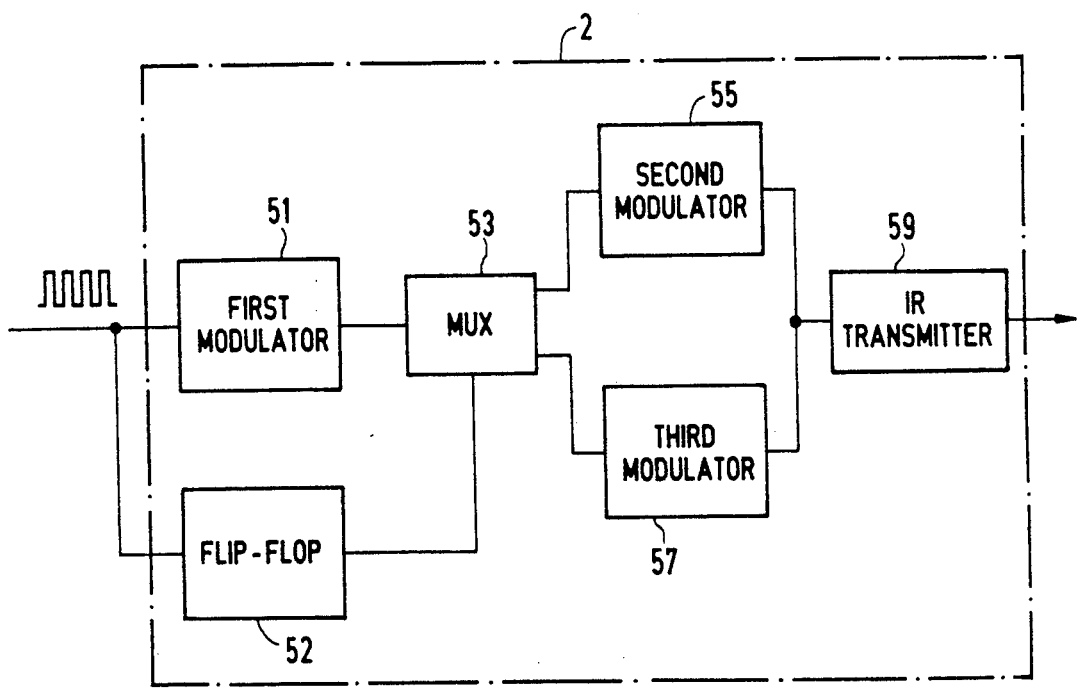
FIG. 5a is a block diagram of a transmitter using three modulating frequencies constructed according to the present invention.

Referring to FIG. 5a, a transmitter which alternately modulates pulses using second and third frequencies to obtain the waveform of FIG. 5 is shown. Pulses are modulated at a first frequency by a first modulator 5. The first modulator 51 is coupled to a multiplexor (Mux) 53. The input waveform is also coupled to a flip-flop 52. Each pulse signal appearing at the input of the first modulator 51 causes the flip-flop 52 to alternate its output between a high and low state. This alternating output controls the output of the Mux 53. Mux 53 alternately sends modulated pulses from the first modulator 51 to a second modulator 55 having a second fequency and a third modulator 57 having a third frequency. The second modulator 55 and the third modulator 57 are coupled to an IR transmitter 59. Every pulse modulated by the second modulator 55 and the third modulator 57 is transmitted by the IR transmitter 59.

The methods mentioned above for modulating pulse signals can be used in conjunction with known methods for encoding messages such as dual phase, PPM, PAM, etc.

Figure 6:
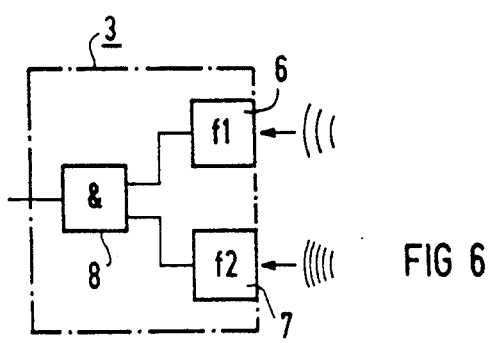
FIG. 6 is a block diagram of a receiver comprising two evaluation circuits for two different modulating frequencies coupled to an AND gate.

Referring to FIG. 6, a block diagram of the receiver 3 is shown. The receiver 3 comprises at least two evaluation circuits 6 and 7 and an AND-gate circuit 8. The modulated pulses appear at the inputs of the evaluation circuits 6 and 7. The evaluation circuits 6 and 7 correspond to the two modulating frequencies f1 and f2. Therefore, only pulse signals having a modulating frequency equal to f1 or f2 will pass, respectively, through the evaluation circuits 6 and 7. The outputs of the evaluation circuits 6 and 7 are concatenated in an AND-gate circuit 8. Therefore, the evaluation circuits 6 and 7 block all noise components appearing in the transmission signal.

Infrared signals can be used as the medium for the transmission link when modulating frequencies have a magnitude of approximately 455 kHz.

I claim:

1. A transmission link for transmitting a sequence of pulses and intervals over a transmission medium comprising:
    a transmitter including means for modulating pulses with at least two frequencies to form modulated pulse signals containing said two frequencies;
    a receiver having a separate evaluation circuit corresponding to each modulation frequency, each evaluation circuit having as an input said modulated pulses and providing a demodulated output; and
    an AND-gate circuit, having at least two inputs, each input being coupled to a respective output of one of said evaluation circuits, whereby said AND-gate circuit concatenates the demodulated pulse signals appearing at the outputs of said evaluation circuits 2. The transmission link of claim 1, wherein said means for modulating include first means for modulating each pulse signal with a first modulating frequency and second means for modulating each pulse with a second modulating frequency having a higher frequency magnitude than said first modulating frequency.

3. The transmission link of claim 2, wherein said first modulating frequency has a frequency magnitude in a range from 30 to 50 kHz and the second modulating frequency has a frequency magnitude in a range from 400 to 500 kHz.

4. The transmission link of claim 1, wherein said means for modulating include first means for modulating each pulse signal with a first modulating frequency to form a modulated pulse signal, and second and third means to modulate each modulated pulse signal alternately with a second and third modulating frequency.

5. The transmission link of claim 4, wherein said modulating means includes means to modulate each modulated pulse signal alternately with three or more additional modulating frequencies.

6. The transmission link of claim 1, wherein said transmission medium is infrared light.

7. The transmission link of claim 2, wherein said transmission medium is infrared light.

8. The transmission link of claim 3, wherein said transmission medium is infrared light.

9. The transmission link of claim 4, wherein said transmission medium is infrared light.

10. A method of transmitting a sequence of pulses and intervals over a transmission medium comprising:
    modulating pulses with at least two frequencies to form modulated pulses containing said two frequencies;
    transmitting said modulated pulses over the medium;
    seperately receiving said modulated pulses;
    evaluating said pulses at each modulating frequency; and
    ANDing the respective results of said evaluations whereby said evaluation results will be concatenated.

11. The method of claim 10, comprising modulating each pulse signal with a first modulating frequency and a second modulating frequency having a higher frequency magnitude than the first modulating frequency.

12. The method of claim 11, wherein said first modulating frequency has a frequency magnitude in a range from 30 to 50 kHz and the second modulating frequency has a frequency magnitude in a range from 400 to 500 kHz.

13. The method of claim 10, comprising modulating each pulse signal with a first modulating frequency to form a modulated pulse signal, and further modulating each modulated pulse signal alternately with a second and third modulating frequency.

14. The method of claim 13, comprising modulating each modulated pulse signal alternately with three or more additional modulating frequencies.

15. The method of claim 10, wherein said transmission medium is infrared light.

16. The method of claim 11, wherein said transmission medium is infrared light.

17. The method of claim 12, wherein said transmission medium is infrared light.

18. The transmission link of claim 13, wherein said transmission medium is infrared light.

* * * * *